United States Patent [19]

Chan et al.

[11] Patent Number: 5,647,391

[45] Date of Patent: Jul. 15, 1997

[54] SENSING ARRANGEMENT FOR SENSING THE ADDITION OF REACTANTS TO A SOLUTION

[75] Inventors: Cedric Chan; James Livingston, both of Santa Cruz, Calif.

[73] Assignee: Diversey Corporation, Ontario, Canada

[21] Appl. No.: 630,503

[22] Filed: Apr. 11, 1996

[51] Int. Cl.$^6$ .................................................. G05D 11/00
[52] U.S. Cl. ........................... 137/93; 137/101.19; 137/5; 366/152.4
[58] Field of Search .................... 137/93, 5, 101.19; 366/152.4

[56] References Cited

U.S. PATENT DOCUMENTS

| 3,134,070 | 5/1964 | Meyer | 137/93 |
|---|---|---|---|
| 3,253,741 | 5/1966 | Russell et al. | 222/52 |
| 3,592,212 | 7/1971 | Schleimer | 137/93 |
| 3,605,783 | 9/1971 | Pecker et al. | 137/93 |
| 4,031,912 | 6/1977 | Lu et al. | 137/5 |
| 4,211,517 | 7/1980 | Schmid | 137/93 |
| 4,733,798 | 3/1988 | Brady et al. | 222/644 |
| 5,248,577 | 9/1993 | Jerome et al. | 430/30 |
| 5,400,818 | 3/1995 | Cosentino et al. | 137/551 |

*Primary Examiner*—Denise L. Ferensic
*Assistant Examiner*—Ramyar M. Farid
*Attorney, Agent, or Firm*—Hickman Beyer & Weaver

[57] ABSTRACT

A sensing arrangement for sensing the addition of reactants to a solution within a tank which includes a first inlet, a second inlet, and a reactant supply controller for controlling the addition of reactants into the tank through the first and second inlets. The first inlet is configured to supply a first reactant to the tank and the second inlet is configured to supply a second reactant to the tank. The sensing arrangement comprises a detector, such as a conductivity detector or an ion concentration detector, having a probe for measuring the presence of the reactants in the solution within the tank. The probe is positioned substantially adjacent the second inlet. The detector provides a mechanism for measuring the presence of and concentration of the first reactant in the solution while the first reactant is added to and mixed with the solution. The detector also provides a mechanism for measuring the presence of the second reactant in a portion of the solution substantially adjacent the second inlet as the second reactant is being added to the solution thereby detecting the influx of the second reactant as it is introduced into the tank.

18 Claims, 1 Drawing Sheet

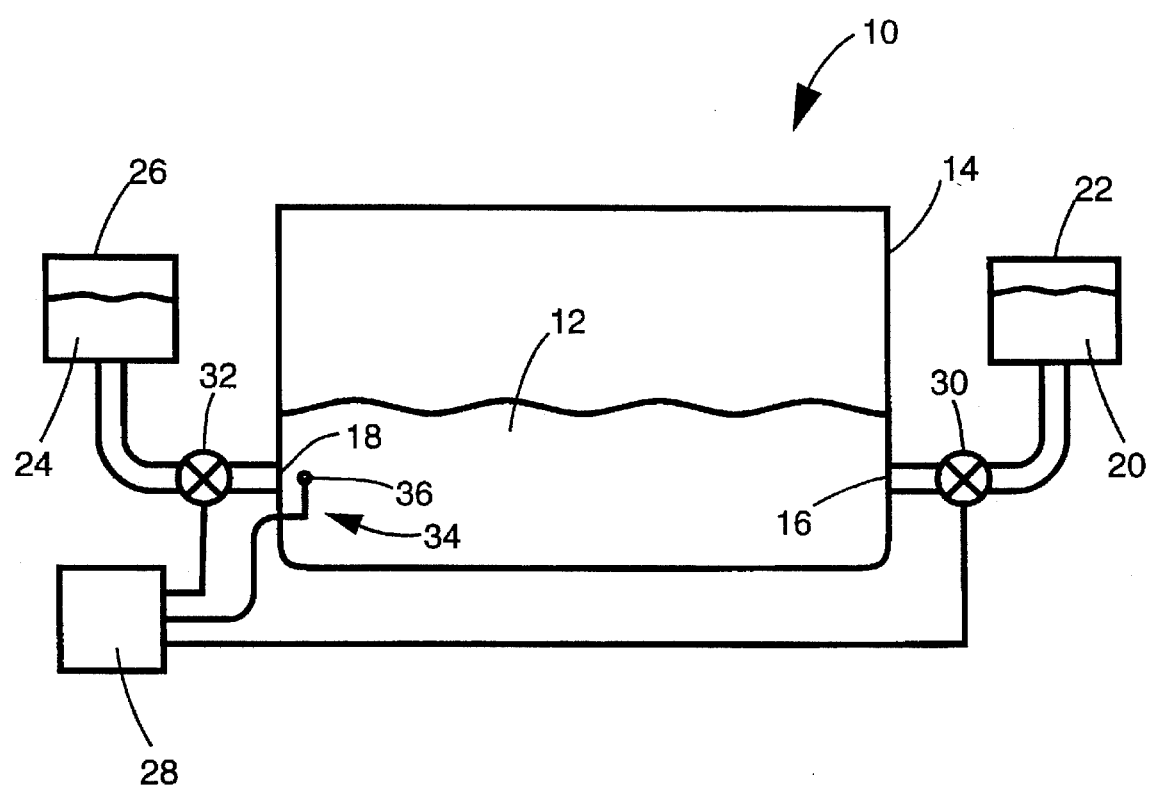

SENSING ARRANGEMENT FOR SENSING THE ADDITION OF REACTANTS TO A SOLUTION

BACKGROUND OF THE INVENTION

The present invention relates generally to a sensing arrangement for sensing the addition of reactants into a solution in a tank. More specifically, the invention relates to a sensing arrangement which uses a detector to detect the concentration of the solution as a first reactant is added through a first inlet and mixed with the solution. The detector is positioned adjacent a second inlet and is also used to detect the influx of a second reactant as it is added through the second inlet.

In commercial cleaning systems such as commercial dishwashers, the detergent or chemicals used in the process are sometimes fed into the machine as a two or more part system. For dishwashers this system is typically a two part system made up of a Chemical Energy part and a Chelant part. The Chemical Energy is usually Sodium Hydroxide and water or some other highly caustic liquid and the Chelant is usually a sequestering agent such as NTA, EDTA, or STPP mixed with water. These two parts are mixed in the dishwasher's wash tank to produce a cleaning product that is customized for each situation to match the needs as to soil levels and the water hardness. The Chemical Energy part is adjusted according to the soil levels and the Chelant is adjusted according to the water hardness. The difficulty with this two part approach is that if the ratios of the two part detergent system are not kept within fairly close tolerances, either the amount of the relatively expensive Chelant unnecessarily increases therefore increasing the operating costs or the dishwasher scales up if not enough Chelant is used.

The present invention discloses a novel sensing arrangement which is used to provide feedback information to a reagent supply controller. The controller uses this sensed information to control the amounts of chemicals added to the solution.

SUMMARY OF THE INVENTION

As will be described in more detail hereinafter, a sensing arrangement for sensing the addition of reactants to a solution within a tank is disclosed. The tank includes a first inlet, a second inlet, and a reactant supply controller for controlling the addition of reactants into the tank through the first and second inlets. The first inlet is configured to supply a first reactant to the tank and the second inlet is configured to supply a second reactant to the tank. The sensing arrangement includes a detector, such as a conductivity detector or an ion concentration detector, having a probe for measuring the concentration of the reactants in the solution within the tank. The probe is positioned substantially adjacent the second inlet. The detector provides a mechanism for measuring the concentration of the reactants in the solution while the first reactant is added to and mixed with the solution. The detector also provides a mechanism for detecting the addition of the second reactant within a portion of the solution substantially adjacent the second inlet as the second reactant is being added to the solution thereby detecting the influx of the second reactant as it is introduced into the tank.

In one embodiment of the present invention, the tank is a dish washing machine tank, the detector is a conductivity detector, and the first and second reactants are a two part detergent. The first reactant is a chemical energy component of the two part detergent such as Sodium Hydroxide and water and the second reactant is a Chelant component of the two part detergent such as a sequestering agent and water.

In accordance with one embodiment of a method of the present invention, the detector is used to measure the concentration of the reactants in the solution while the first reactant is added to and allowed to mix with the solution. The detector is also used to detect the addition of the second reactant within a portion of the solution substantially adjacent the second inlet as the second reactant is being added to the solution thereby detecting the influx of the second reactant as it is introduced into the tank. The detector is in communication with the reactant supply controller and the steps of measuring the concentration and influx of the reactants in the solution include the step of providing the information from the detector to the reactant supply controller to determine whether more reactants need to be added to the solution to obtain the desired concentrations of reactants. Also, during the steps of measuring the concentration and influx of the reactants in the solution, if the influx of the reactants are not detected, the controller initiates a predetermined action such as issuing an alarm or causing the overall system to shut down.

BRIEF DESCRIPTION OF THE DRAWINGS

The features of the present invention may best be understood by reference to the following description of the presently preferred embodiments together with the accompanying drawing in which:

FIG. 1 is a diagrammatic illustration of an apparatus in accordance with the present invention including a tank and a sensing arrangement for sensing the addition of reactants into a solution within the tank.

DETAILED DESCRIPTION OF THE PREFERRED EMBODIMENTS

Referring to FIG. 1, an apparatus generally designated by reference numeral 10 for controlling the mixing of a solution 12 will be described. Apparatus 10 includes a tank 14 having a first inlet 16 and a second inlet 18. The first inlet 16 is configured to supply a first reactant 20 to tank 14 from a suitable and readily providable source 22. The second inlet 18 is configured to supply a second reactant 24 to tank 14 from a suitable and readily providable source 26. A reactant supply controller 28 controls the addition of the first and second reactants into the tank through the first and second inlets. Controller 28 may take any suitable form. In the embodiment shown, controller 28 operatively controls two peristaltic pumps 30 and 32 which controllably pump reactants 20 and 24 into tank 14 respectively. Apparatus 10 may also include a suitable and readily providable agitator or mixing device to actively mix the solution as the reactants are added, or alternatively, the solution may be allowed to mix without the assistance of a mixing device.

In accordance with the invention, a sensing arrangement or detector 34 is positioned in the tank substantially adjacent second inlet 18. Detector 34 may be positioned directly in front of inlet 18 such that as reactant 24 is fed into tank 14 it flows directly into detector 34. Alternatively, detector 34 may be positioned adjacent inlet 18, for example, attached to the wall of tank 14 adjacent inlet 18. Sensing arrangement 34 includes a probe 36 for measuring certain characteristics of solution 12. Sensing arrangement 34 may take a wide variety of suitable and readily providable forms including, but not limited to, a conductivity detector or an ion detector. The present invention would equally apply to any sensor which is capable of sensing a particular characteristic of the solution which immediately surrounds the sensor and which is caused by the reactants.

As will be described in more detail hereinafter, because of the positioning of sensing arrangement 34 relative to inlets 16 and 18, sensing arrangement 34 provides an arrangement for measuring the concentration of and the change in the concentration of first reactant 20 within the solution while the first reactant is added to and allowed to mix with the solution. Furthermore, in accordance with the invention, since sensing arrangement 34 is positioned adjacent inlet 18, it also provides a mechanism for measuring the influx of second reactant 24 into a portion of solution 12 substantially adjacent or immediately surrounding second inlet 18 as second reactant 24 is being added to the solution. This arrangement allows the probe 36 to detect the influx of second reactant 24 as it is introduced into the tank even if second reactant 24 is a reactant which would be difficult to detect using probe 36 once reactant 24 is thoroughly mixed into the solution. Because inlet 18 discharges second reactant 24 substantially adjacent or directly into probe 36, the concentration of second reactant 24 in the area immediately surrounding probe 36 is momentarily substantially higher than would be the case once reactant 24 is mixed into solution. This allows probe 36 to detect certain characteristics of reactant 24 during the short time in is present in high concentrations immediately surrounding the probe thereby detecting the influx of reactant 24.

The positioning of probe 36 adjacent inlet 18 also allows probe 36 to verify the influx of reactant 24 in real time without having to wait for the mixing to occur. This feature allows the controller to move through successive steps of adding reactants more quickly by avoiding the need to allow time for mixing. This feature also helps avoid over use of the first reactant which may be caused by adding to much reactant before the detector has a chance to detect the effect of the added reactant due to not yet having been thoroughly mixed into the solution.

This sensor arrangement allows a single detector to be used for a variety of purposes which eliminates the need for additional detectors or probes and therefore reduces the cost and complexity of the apparatus. First, the detector is used to detect the overall concentration of reactants within the solution. This provides the controller with information which allows the controller to determine whether or not more reactant is required to reach the desired levels of reactants. Second, by using the detector to detect the change in concentration of the reactants within the solution as the first reactant is added to and mixed with the solution, the detector acts to verify that the first reactant is actually being added when the controller is attempting to add the first reactant. And third, as described above, the detector is used to verify the influx of the second reactant. By verifying the actual addition of the reactants, this sensor arrangement provides a mechanism for identifying when there is a problem with the apparatus such as a clogged supply line or the apparatus running out of supply of one of the reactants. All of these functions are provided by the single probe. By combining this sensor arrangement with a suitable controller which controls the addition of the reactants to the solution, an apparatus which precisely controls the addition of reactants to a solution is provided.

In one preferred embodiment, apparatus 10 takes the form of a commercial dishwasher. Controller 28 is used to control the dispensing of a two part detergent system in which first reactant 20 is the Chemical Energy part of the detergent and second reactant 24 is the Chelant part of the detergent. Chemical Energy reactant 20 may be, for example, Sodium Hydroxide and water and Chelant reactant 24 may be, for example, a sequestering agent such as NTA, EDTA, or STPP mixed with water. In this embodiment, probe 36 is a conductivity detector probe which is used to detect the conductivity of the solution at different times as the cleaning solution 12 within tank 14 is being mixed. This conductivity information is provided to controller 28 by sensing arrangement 34 and is used to control the addition of the two reactants making up the two part detergent. Since the Chemical Energy part of the detergent is many times more conductive than the Chelant part, and in accordance with the present invention, the two parts are fed into tank 14 one at a time and are sensed individually by probe 36 at different times. As described above, probe 36 is positioned substantially adjacent inlet 18 and, in this embodiment, probe 36 is positioned such that Chelant reactant 24 is directed through inlet 18 directly into probe 36.

Now that the configuration of the commercial dishwasher embodiment has been described, one preferred embodiment of the operation of the dishwasher will be described. In order to mix the proper portions of the two part detergent to form cleaning solution 12 within tank 14, controller 28 first causes pump 30 to add a predetermined amount of Chemical Energy reactant 20 to tank 14. Sensing arrangement 34, using conductivity detector probe 36, measures the effect of the added reactant on solution 12 by measuring the conductivity of the solution as reactant 20 is added and allowed to mix with the solution. Typically the conductivity of the solution would be expected to change by at least a predetermined minimum amount indicating that Chemical energy reactant 20 has actually been added. If this minimum change in conductivity is not sensed by sensing arrangement 34, controller 28 knows that there is a problem feeding the first reactant into the solution and therefore takes an appropriate action. This action may involve automatically priming pump 30 and/or shutting down the overall system and issuing an alarm indicating the apparatus is out of the Chemical Energy reactant.

After the Chemical Energy reactant 20 has been fed into tank 14 and properly detected, controller 28 causes pump 32 to add a predetermined amount of Chelant reactant 24 to the solution. In accordance with the present invention, Chelant reactant 24 is added to the solution through inlet 18 such that it flows directly into probe 36. This causes the concentration of reactant 24 to be momentarily high in the portion of the solution substantially adjacent probe 36 before it mixes throughout solution 12. During this period of high concentration, sensing arrangement 34 uses conductivity detector probe 36 to sense the influx of Chelant reactant 24 even though the solution contains Chemical Energy reactant 20. Because Chemical Energy reactant 20 has a substantially higher conductivity than Chelant reactant 24, if Chelant reactant 24 were allowed to thoroughly mix with the solution prior to attempting to detect the presence of Chelant reactant 24, conductivity detector probe 36 may not be able to properly detect the presence of the added Chelant reactant. However, since Chelant reactant 24 is added through inlet 18 directly into probe 36, it is momentarily present around probe 36 in sufficiently high concentrations to allow probe 36 to detect its particular conductivity rather than the conductivity of the overall solution therefore allowing the detector to detect the influx of the Chelant reactant. As described above for the first reactant, if sensing arrangement 34 does not detect the presence of Chelant reactant 24 as it is being added to the solution, controller 28 knows to take certain predetermined actions. Again, these predetermined actions may include initiating an automatic priming of pump 32 and/or causing the system to shut down and issue an alarm indicating the apparatus is out of Chelant. Also, as mentioned above, since the influx of Chelant reactant 24 is detected as it is added to the solution, there is no need to wait for the mixing of the solution prior to moving on to the next step.

The above described steps of adding the Chemical Energy part and Chelant part of the detergent to the solution may be repeated as many times as necessary until the desired concentration of detergent is present in the solution. The desired concentration of the solution correlates to the conductivity of the solution and therefore is sensed by using conductivity detector probe 36 to detect the overall conductivity of the solution.

By using the above described sensing arrangement, sensing arrangement 34 may be used to detect the addition of both the Chemical Energy reactant and the Chelant reactant each time they are added to the solution. Also, since (i) sensing arrangement 34 senses the addition of each of the reactants as they are added, (ii) sensing arrangement 34 senses the conductivity of the overall solution, and (iii) controller 28 dispenses predetermined amounts of each reactant each time the reactant is added, this approach allows the ratios of the two reactants to be tightly controlled. By properly controlling the ratios of the two part detergent system, the operating cost of the system are held down by avoiding over use or under use of the chemicals making up the two part detergent. As mentioned above, if the amount of the relatively expensive Chelant unnecessarily increases, the operating costs unnecessarily increase. However, if not enough Chelant is used the dishwasher scales up.

Although the above embodiments have been describe with the various components having particular respective orientations, it should be understood that the present invention may take on a wide variety of specific configurations with the various components being located in a wide variety of positions and mutual orientations and still remain within the scope of the present invention. For example, although the first and the second inlets have been illustrated as being located on opposite sides of the tank, this is not a requirement. So long as the detector is positioned substantially adjacent the second inlet such that the detector may detect the influx of the second reactant as it is added to the solution, as well as detect the concentration of the reactants in the solution as the first reactant is added and mixed with the solution, the present invention would equally apply. Furthermore, it should be understood that although the example given includes only two inlets and two reactants, other configurations including more inlets and reactants would still remain within the scope of the invention.

Also, although the specific embodiment described above is a commercial dishwasher, the invention equally applies to other apparatus in which reactants are mixed into a solution. These other apparatus may include, but are not limited to, laundering machines, mixing tanks, and other such apparatus. Furthermore, the tank may be a premixing tank instead of the main tank in which the solution is to be used. If this is the case, the reactants would be added, detected, and mixed as described above in the premix tank and then dispensed into the desired main tank or used in any other desired manner. Although peristaltic pumps are described for pumping the reactants into the tank, this is not a requirement. Any other suitable arrangement for dispensing reactants into the tank would remain within the scope of the invention. As mentioned above, sensing arrangement 34 may take a variety of forms such as a conductivity detector, ion detector, or other such devices. Therefore, the present examples are to be considered as illustrative and not restrictive, and the invention is not to be limited to the details given herein, but may be modified within the scope of the appended claims.

What is claimed is:

1. An apparatus for controlling the mixing of a solution comprising:
   a) a tank including a first and a second inlet, the first inlet being configured to supply a first reactant to the tank, and the second inlet being configured to supply a second reactant to the tank;
   b) a reactant supply controller for controlling the addition of the first and second reactants into the tank through the first and second inlets;
   c) a detector having a probe for measuring the ionic concentration of the reactants in the solution within the tank, the probe being positioned in the tank substantially adjacent the second inlet such that the probe substantially immediately detects the addition of the second reactant when the second reactant is added to the solution, the detector providing a mechanism for measuring the concentration of the reactants within the solution while the first reactant is added to and allowed to mix with the solution such that the detector substantially detects the ionic concentration of the mixed solution, and the detector providing a mechanism for detecting the addition of the second reactant within a portion of the solution substantially adjacent the second inlet as the second reactant is being added to the solution thereby detecting the influx of the second reactant as it is introduced into the tank thereby permitting verification of the influx of the second reactant in real time without having to wait for mixing to occur.

2. An apparatus according to claim 1 wherein the detector is a conductivity detector.

3. An apparatus according to claim 1 wherein the detector is an ion concentration detector.

4. An apparatus according to claim 2 wherein the apparatus is a washing machine.

5. An apparatus according to claim 2 wherein the apparatus is a dish washing machine.

6. An apparatus according to claim 5 wherein the first and second reactants are a two part detergent, the first reactant being a chemical energy component of the two part detergent made up of sodium hydroxide and water and the second reactant is a chelant component of the two part detergent made up of a sequestering agent and water.

7. A sensing arrangement for sensing the addition of reactants to a solution within a tank, the tank including a first inlet, a second inlet, and a reactant supply controller for controlling the addition of reactants into the tank through the first and second inlets, the first inlet being configured to supply a first reactant to the tank and the second inlet being configured to supply a second reactant to the tank, the arrangement comprising:

a detector having a probe for measuring the ionic concentration of the reactants in the solution within the tank, the probe being positioned substantially adjacent the second inlet such that the probe substantially immediately detects the addition of the second reactant when the second reactant is added to the solution, the detector providing a mechanism for measuring the concentration of the reactants in the solution while the first reactant is added to and allowed to mix with the solution such that the detector substantially detects the ionic concentration of the mixed solution, and the detector providing a mechanism for detecting the addition of the second reactant in a portion of the solution substantially adjacent the second inlet as the second reactant is being added to the solution thereby detecting the influx of the second reactant as it is introduced into the tank thereby permitting the verification of the influx of the second reactant in real time without having to wait for mixing to occur.

8. An arrangement according to claim 7 wherein the detector is a detector selected from the group consisting of a conductivity detector and an ion concentration detector.

9. An arrangement according to claim 7 wherein the tank is a dish washing machine tank.

10. An arrangement according to claim 9 wherein the first and second reactants are a two part detergent in which the first reactant is a chemical energy component of the two part detergent including sodium hydroxide and water and the second reactant is a chelant component of the two part detergent including a sequestering agent and water.

11. A method for controlling the mixing of a solution, the method comprising the steps of:

a) providing a tank including a first and a second inlet, the first inlet being configured to supply a first reactant to the tank, and the second inlet being configured to supply a second reactant to the tank;

b) providing a reactant supply controller for controlling the addition of the first and second reactants into the tank through the first and second inlets;

c) providing a detector having a probe for measuring the ionic concentration of the reactants in the solution within the tank, the probe being positioned in the tank substantially adjacent the second inlet, d) using the detector, measuring the concentration of the solution while the first reactant is added to and allowed to mix with the solution such that the detector substantially detects the ionic concentration of the mixed solution, and e) using the detector, detecting the addition of the second reactant in a portion of the solution substantially adjacent the second inlet as the second reactant is being added to the solution thereby substantially immediately detecting the influx of the second reactant as it is introduced into the tank thereby permitting the verification of the influx of the second reactant in real time without having to wait for mixing to occur.

12. A method according to claim 11 wherein the detector is a conductivity detector.

13. A method according to claim 11 wherein the detector is an ion concentration detector.

14. A method according to claim 11 wherein the detector is in communication with the reactant supply controller and wherein the steps of measuring the concentration and influx of the reactants in the solution include the step of providing the information from the detector to the reactant supply controller to determine whether more reactants need to be added to the solution to obtain the desired concentrations of reactants.

15. A method according to claim 14 wherein during the steps of measuring the influx of the reactants in the solution, if the influx of the reactants are not detected, the controller initiates a predetermined action.

16. A method according to claim 11 wherein the tank is a washing machine tank.

17. A method according to claim 11 wherein the tank is a dish washing machine tank.

18. A method according to claim 17 wherein the first and second reactants are a two part detergent in which the first reactant is a chemical energy component of the two part detergent including sodium hydroxide and water and the second reactant is chelant component of the two part detergent including a sequestering agent and water.

* * * * *